T. Miller.
Canal Scraper.
Nº 46,128. Patented Jan. 31, 1865.

Witnesses:
John Joyce
Geo. W. Meeker

Inventor:
Thos Miller

UNITED STATES PATENT OFFICE.

THOMAS MILLER, OF COLUMBUS, OHIO.

IMPROVED CANAL-SCRAPER.

Specification forming part of Letters Patent No. 46,128, dated January 31, 1865.

*To all whom it may concern:*

Be it known that I, THOMAS MILLER, of Columbus, Franklin county, Ohio, have invented a new and Improved Scraper for Cleaning Canals and other Water-Courses; and I do hereby declare that the following is a full and exact description thereof, reference being had to the accompanying drawings, and to the letters of reference marked thereon.

The nature of my invention consists in providing a scraper movable about a pivot, so that an angle of any desirable obliquity can be presented to the current by the person operating the machine, by means of which obliquity the scraper can be guided to any part of the channel to tear up and loosen the vegetable growth or sedimentary deposit, and allow the same to be washed off by the current.

A person of ordinary skill will be enabled to make and use my invention from the following description of its construction and operation.

Figure 4:
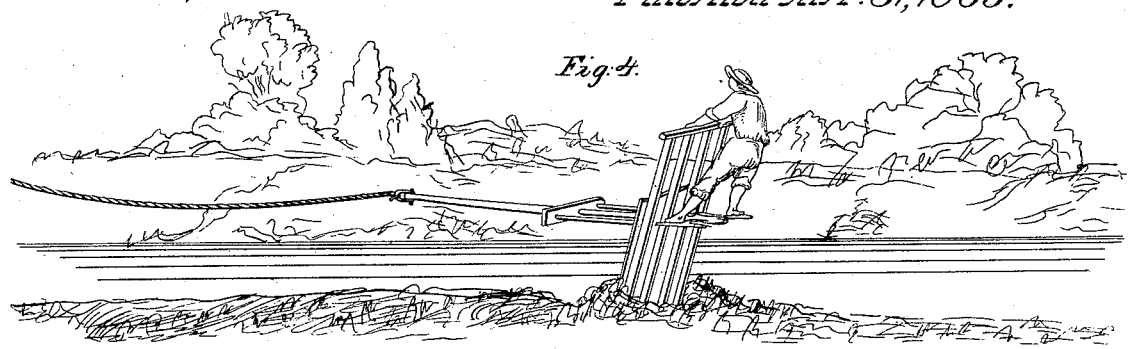
Figure 2:
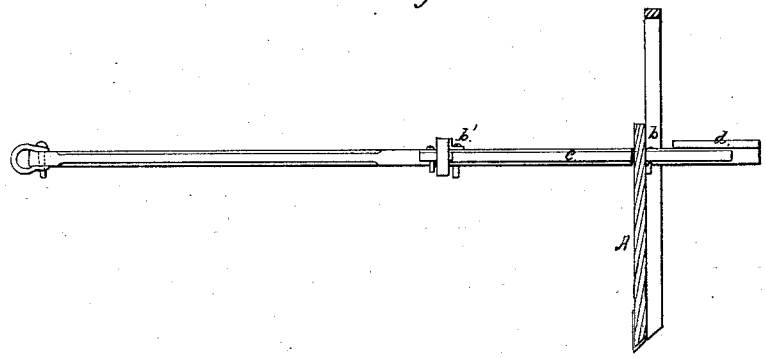
Figure 3:
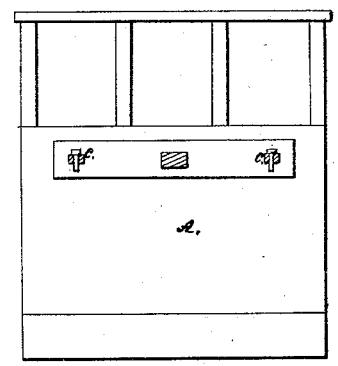
Figure 1:
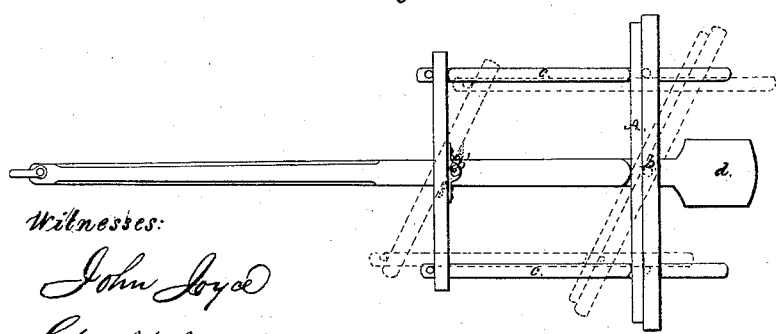

Figure 1 is a plan; Fig. 2, a side elevation; Fig. 3, a front elevation, and Fig. 4 a view of the machine in operation.

The letters are the same in the various drawings.

A is a substantial scraper attached to the tongue by the bolts at $b$ $b'$, and having the parallels $c$ $c$ connected, as shown in the drawings. The parallels project behind the scraper, and the operator, who stands upon the foot-board $d$, varies the direction of the scraper by throwing his weight upon one or the other of these parallels, thereby causing the scraper to assume an oblique angle with the direction of the draft, whereby the scraper is thrown to the right or left of the channel as the case may be.

What I claim as my invention, and desire to secure by Letters Patent, is—

The combination and arrangement of the tongue with projecting foot-board and parallels, whereby the movable principle is attained for the scraper, subject to the control of the operator, substantially as set forth, and for the purposes specified.

THOMAS MILLER.

Witnesses:
JOHN JOYCE,
GEO. W. MEEKER.